(No Model.)

W. G. GALLOWAY.
DRYING KILN.

No. 526,349. Patented Sept. 18, 1894.

Witnesses:
Jos. H. Blackwood
Albert B. Blackwood

Inventor.
Wm. G. Galloway,
By Wm. Hunter Myers,
Attorney.

(No Model.) 2 Sheets—Sheet 2.

W. G. GALLOWAY.
DRYING KILN.

No. 526,349. Patented Sept. 18, 1894.

Witnesses:
Jos H Blackwood
Albert B Blackwood

Inventor.
Wm G Galloway,
By Wm Hunter Myers,
Attorney.

UNITED STATES PATENT OFFICE.

WILLIAM G. GALLOWAY, OF CHICAGO, ILLINOIS.

DRYING-KILN.

SPECIFICATION forming part of Letters Patent No. 526,349, dated September 18, 1894.

Application filed February 15, 1894. Serial No. 500,280. (No model.)

*To all whom it may concern:*

Be it known that I, WILLIAM G. GALLOWAY, a citizen of the United States, residing at Chicago, in the county of Cook and State of Illinois, have invented certain new and useful Improvements in Drying-Kilns, of which the following is a specification, reference being had therein to the accompanying drawings.

My invention relates to an improved kiln for drying brick, lumber, &c.

The object of my invention is to improve the distribution of air within the kiln, and also to provide for the immediate escape of the air after it has once come into contact with the bricks or other articles to be dried and thereby become ladened with moisture, whereby the use of condensers is avoided. These results I accomplish through the medium of vertical air-ducts whose upper ends are open to the outside atmosphere only, while their lower ends open within the kiln in proximity to the heating-coils and are provided with air-deflectors, which latter, when desirable, may also be used to close a portion of all the air-inlets, said ducts being formed in or adjacent to the partition and side walls of the kiln.

My improved kiln, in permitting the escape of the heated air after it has once absorbed moisture, differs radically and materially from a kiln having down-draft flues opening inside at both their upper and lower ends, causing a return circulation of the air, and thereby necessitating condensers for condensing the moisture absorbed by the hot air each time the latter comes into contact with the articles being dried. Furthermore, these condensers do not always accomplish that purpose, especially in hot weather, when they frequently become practically as hot as the air itself, in which case, it is evident, no condensation will ensue when the moisture-ladened air comes into contact with them. In my kiln the down-draft ducts, as no portion of them is required to be kept cool for condensation purposes, become highly heated soon after the kiln is put in operation, and thereby serve to partially heat the air before it reaches the coils.

My invention will first be described in connection with the accompanying drawings, and then pointed out in the claims.

Figure 1:
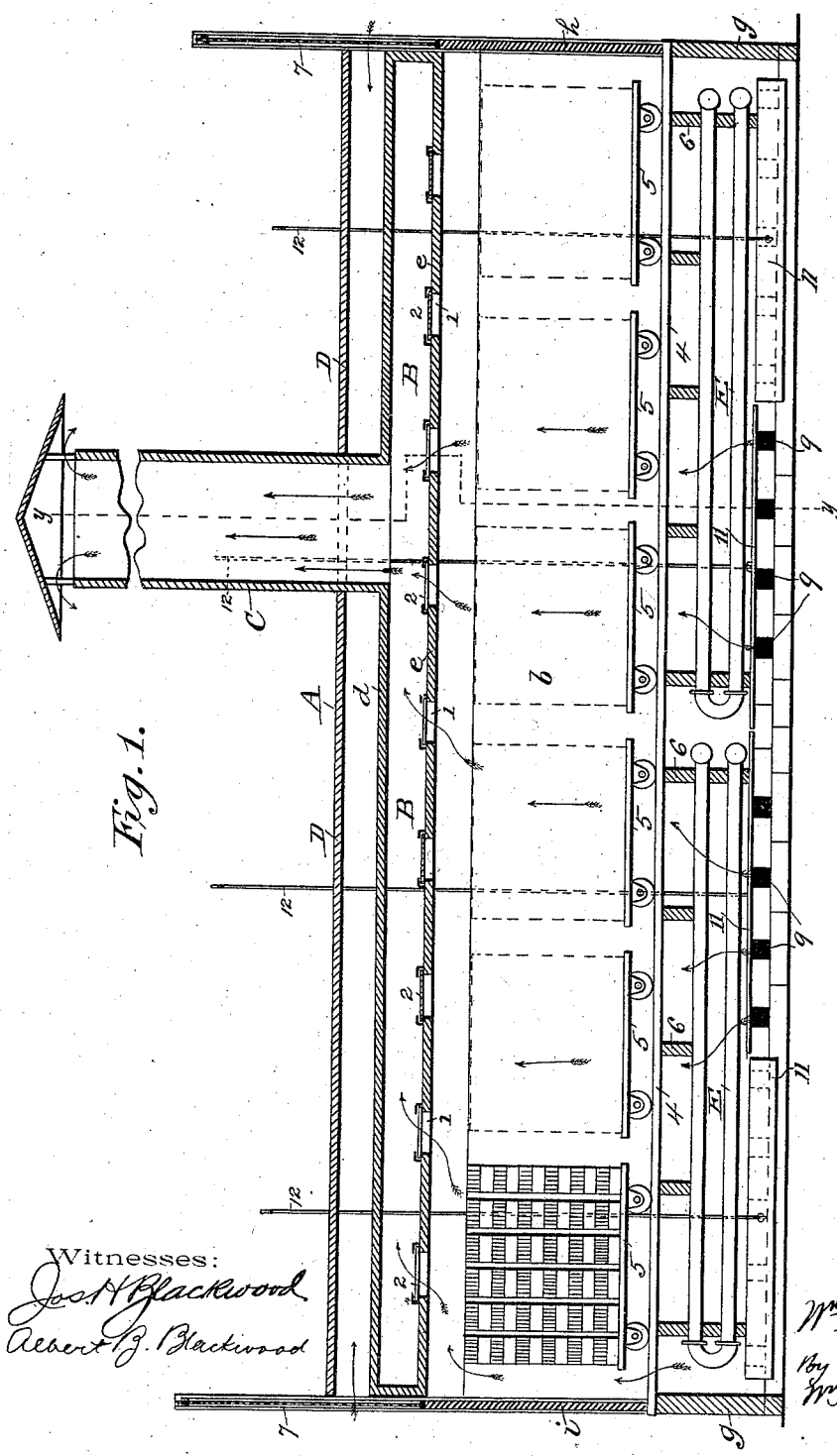
Figure 2:
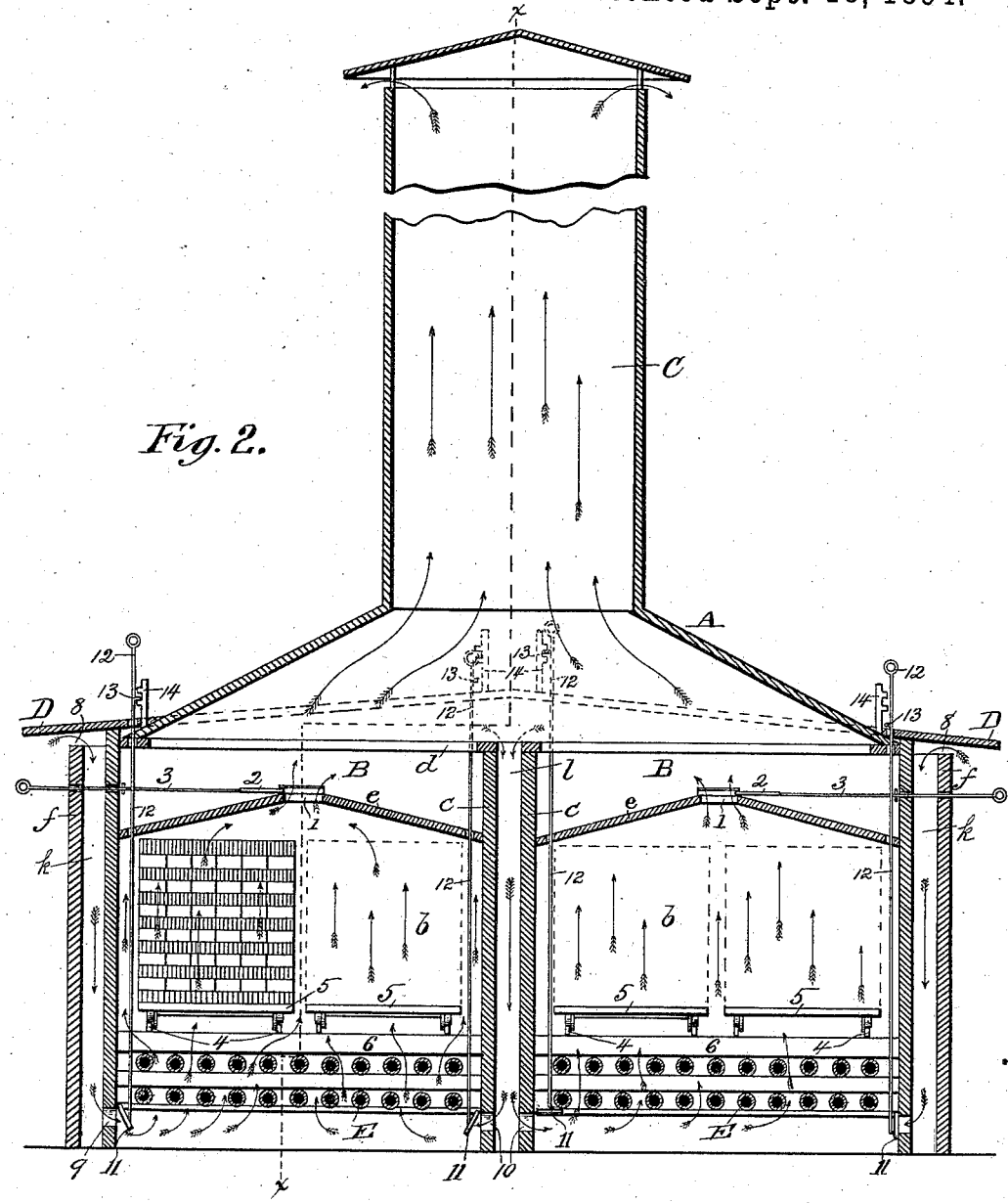

Figure 1 of the drawings is a longitudinal vertical section of a kiln constructed in accordance with my invention, taken on the line $x\ x$, Fig. 2. Fig. 2 is a cross-section of the same, taken on the line $y\ y$, Fig. 1.

Referring to the drawings, A is a building of any required length and width, divided longitudinally into compartments $b$ by partitions $c$. The desired number of these compartments will, of course, depend upon the width of the building; but for simplicity of illustration I have shown only two, and consequently but one partition. Each compartment is closed at top, except immediately under the flue, which will be hereinafter described, by a ceiling $d$, forming the upper wall of the hot-air chamber B, the lower wall of said chamber consisting of a sub-ceiling $e$, preferably inclined from its outer edges upward toward the center. In this sub-ceiling, at suitable intervals, are formed openings 1, adapted to be closed, when desired, by sliding covers 2, operated through the medium of rod 3 extending through the side walls $f$ of the kiln and attached to the covers, or in any other practicable manner.

At any desired place on the kiln, preferably toward the receiving end, is located the flue C, the base of which is of a width equal to the combined width of all the compartments, as seen in Fig. 2, and is in open communication with the hot-air chamber B; and the gables of the kiln—that is to say, the space at each end between the ceiling $d$ and roof D—are left open for the admission of air to the inner air-ducts. In the lower portion of each compartment is a series of tracks 4, on which run trucks 5, carrying the bricks or lumber to be dried, these tracks being supported by the end walls $g$ and by joists 6; and beneath the tracks are located steam-coils E. Doors $h$ and $i$, adapted to slide vertically in ways 7, serve, respectively, to close the receiving and discharging ends of the kiln.

So far the above description of the kiln presents nothing new over kilns now in extensive use; but all such kilns of which I have any knowledge are provided with horizontal air-ducts located longitudinally beneath the heating-coils, or vertical ducts arranged to cause a return circulation of the air in the manner hereinbefore stated.

In carrying out my invention I form any desired number of vertical air-ducts $k$ in the side walls $f$ of the kiln, leaving these ducts open on the outside at the top, as at 8, and on the inside of the kiln at the bottom, as at 9, the roof D projecting over the side walls and shielding the flues from rain, snow, &c. In addition to the ducts $k$, I also form any desired number of similar air-ducts $l$ in the partitions $c$, these ducts being likewise open at the top to the outside atmosphere, as the gables of the kiln are open, and opening at the lower end, as at 10, into each of the adjoining compartments. By this construction, no matter what the number of the compartments may be, I obtain a delivery of air to the heating-coils from both sides of each compartment; and, therefore, as the ducts are placed at short intervals throughout the length of the compartments, I secure an even and thorough distribution of the air to be heated. It will be apparent that the air-ducts need not necessarily be formed in the side and partition walls, as they may be formed adjacent thereto with practically the same result.

In order that the currents of air entering the compartments may be deflected, checked, or entirely shut off, I provide deflectors 11, which are simply boards of a suitable width, hinged to the walls at the upper edges of the lower duct-openings 9 and 10. To these deflectors are attached rods 12, which pass through the roof of the kiln, and are provided with lugs 13, which are adapted to engage with notched standards 14 mounted on the roof. By means of these deflectors I can direct the air so that it will come into contact with either the side, middle, or all portions of the heating-coil; or I can close some of the ducts and leave others open. This feature, in connection with the sliding covers on the sub-ceiling, also enables me to pass the heated air longitudinally beneath the hot-air chambers of the compartments.

The operation of my kiln will be obvious from the description above given taken in connection with the drawings.

Having thus fully described my invention, what I claim as new, and desire to secure by Letters Patent, is—

1. A drying-kiln consisting of parallel compartments separated so as to form an air-inlet duct between them, each side compartment having an air-inlet duct or ducts at its outer side, all said ducts being open to the air at the top and communicating with the compartments by valved openings at the bottom, and a transverse flue spanning the compartments and affording an outlet for the moist air therefrom.

2. A drying-kiln consisting of parallel compartments separated so as to form an air-inlet duct between them, each side compartment having an air-inlet duct or ducts at its outer side, all said ducts being open to the air at the top and communicating with the compartments by valved openings at the bottom, a hot-air chamber above each compartment provided with valved openings into the compartments, and a transverse outlet-flue spanning the hot-air chambers and affording an outlet for the moist air therefrom.

In testimony whereof I affix my signature in presence of two witnesses.

WILLIAM G. GALLOWAY.

Witnesses:
GEO. W. CLEMENT,
HARRY A. MOHR.